No. 882,007. PATENTED MAR. 17, 1908.
H. P. KENNEDY.
HORSESHOE.
APPLICATION FILED JUNE 11, 1907.
2 SHEETS—SHEET 1.
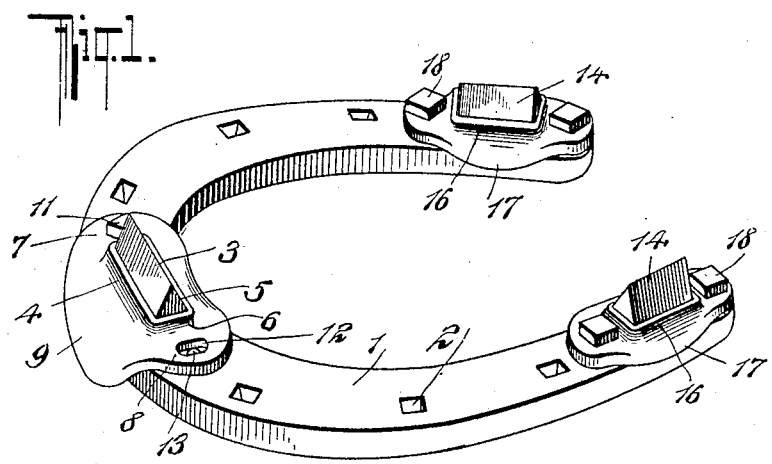
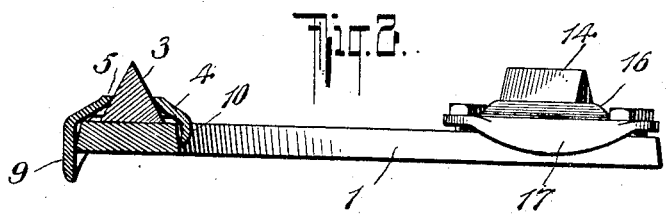
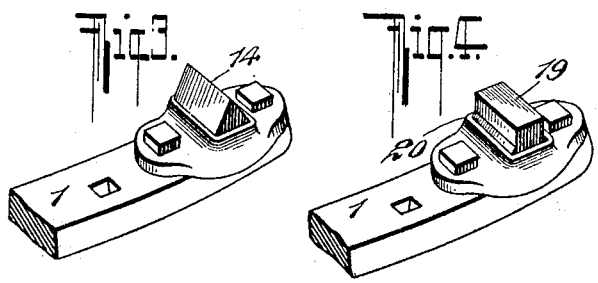
WITNESSES
Herbert Percy Kennedy,
INVENTOR
BY
John K. Macdonald,
ATTORNEY No. 882,007. PATENTED MAR. 17, 1908.
H. P. KENNEDY.
HORSESHOE.
APPLICATION FILED JUNE 11, 1907.
2 SHEETS—SHEET 2.
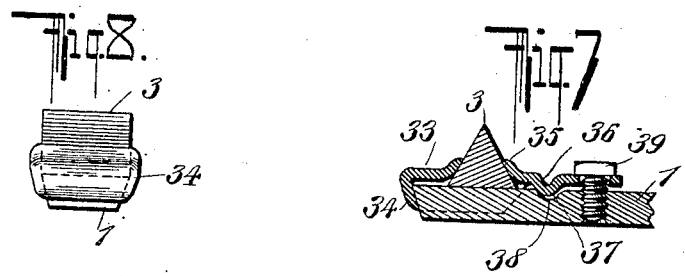
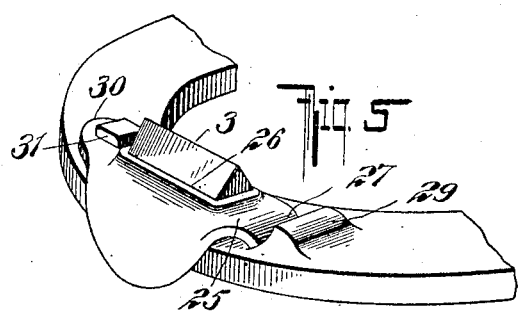
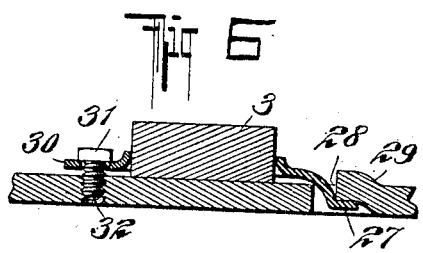
WITNESSES
Herbert Percy Kennedy,
INVENTOR
BY
John K. Macdonald,
ATTORNEY

UNITED STATES PATENT OFFICE.

HERBERT PERCY KENNEDY, OF PETERBORO, ONTARIO, CANADA.

HORSESHOE.

No. 882,007.   Specification of Letters Patent.   Patented March 17, 1908.

Application filed June 11, 1907. Serial No. 378,333.

*To all whom it may concern:*

Be it known that I, HERBERT PERCY KENNEDY, a subject of the King of Great Britain, resident of the city of Peterboro, in the county of Peterboro, Province of Ontario, in the Dominion of Canada, have invented certain new and useful Improvements in Horseshoes, of which the following is a full, clear, and exact specification, such as will enable others skilled in the art to which it appertains to make and use the same.

The invention relates to improvements in horse shoes as described in the following specification and illustrated in the accompanying drawings that form part of the same.

The invention consists essentially in the novel construction and arrangement of parts whereby the shoe calks are removably secured to the shoe and rigidly held in place.

The objects of the invention are to overcome the difficulties incident to the wearing of the calks of a horse shoe, to eliminate the necessity of expert labor in changing the calks, and to devise a calk which may be easily and quickly changed to present a new wearing surface without removing the shoe, of simple and durable construction and cheap to manufacture.

Reference is had to the accompanying drawings, which illustrate as an example, one manner in which the various features of my invention may be embodied, in which drawings, Figure 1 is a perspective view of the underside of a horse shoe fitted with my improved calks; Fig. 2 is a central longitudinal section through Fig. 1; Fig. 3 is a perspective detail of a portion of a horse shoe showing a modified form of heel calk holder; Fig. 4 is a perspective detail of a portion of a horse shoe showing a modified form of heel calk; Fig. 5 is a perspective detail of the front portion of a horse shoe showing a further modified form of toe calk holder; Fig. 6 is a longitudinal vertical section through the calk and holder shown in Fig. 5; Fig. 7 is a central longitudinal sectional detail of a further modified form of heel calk holder; and Fig. 8 is an end elevation of the calk and holder shown in Fig. 7.

Referring to the drawings, 1 is a horse shoe having the under face thereof perfectly smooth and having the usual nail holes 2 extending therethrough.

3 is the toe calk preferably in the form of a triangular prism and resting upon the surface of the shoe upon one of its faces and extending across the point of said shoe.

4 is a retaining plate having a rectangular orifice 5, through the center thereof through which the upwardly projecting angle portion of the calk 3 extends. The plate 4 is preferably flanged upwardly as shown at 6 to fit snugly against the upwardly projecting surfaces of the said calk, the inner wall being beveled and presenting a good bearing surface.

7 and 8 are lugs forming the ends of the plate 4 and 9 is a lip extending from the said plate past the upper side of the shoe 1 and forming a toe flange to the shoe.

10 is a lip extending upwardly from the rear of the plate 4 and engaging the inner surface of the front portion of the shoe 1. The orifice 5 in the plate 4 fits snugly over the calk 3 but it is not large enough to allow the lug portions 7 and 8 of the said plate to fit down against the upper surface of the shoe.

11 is a set screw extending through a suitable orifice in the lug portion 7 and into a suitable threaded orifice in the shoe 1.

12 is a slot in the lug 8 extending crosswise of the plate 4 and registering with a threaded orifice 13 in the shoe 1. A suitable set screw will be inserted through the orifice 12 and screwed into the threaded orifice 13. It will be seen that as the plate 4 is held clear of the upper surface of the shoe the set screws holding the said plate in position may be tightened down upon the said plate in the event of the calk 3 having become at all loosened in the orifice 5 in the said plate. Provision is thereby made for ample adjustment of the said plate. The orifice 12 is in the form of a slot so that in the fitting of a shoe, when it is desired to spread the heel portions, the threaded orifice 13 will remain in alinement with the said slot and the set screw may be inserted therethrough.

14 are the heel calks of similar shape to the toe calk 3, but not as long and resting upon the upper surface of the shoe.

16 are plates having a central orifice therethrough similar to the orifice 5 in the plate 4. The plates 16 are provided with downwardly extending lips or flanges 17 fitting snugly against the sides of the said shoe and the said plates are rigidly secured in position by means of the set screws 18. The plates 16 are also held clear of the surface of the shoe so that they may be adjusted.

The calks 14 shown in Figs. 1 and 2 are arranged longitudinally of the shoe but it must be understood that I can, with equal facility, arrange the calks transversely as shown in Fig. 3.

While the calks have been described as being in the form of a triangular prism, it must be understood that many variations of shape may be made and in Fig. 4 I show one modified form of a heel calk in which the upwardly protruding portion of the calk 19 is formed with a flat surface to contact with the surface of the roadway. The lower portion of the calk 19 is formed with outwardly sloping sides 20 corresponding to the sloping sides of the calks 14. This form of calk may also be used for a toe calk if so desired.

In the form of toe calk shown in Figs. 5 and 6, the same calk is used, but the calk holding plate is somewhat modified in its construction, the object being to dispense with one of the set screws. In order to accomplish this result, the plate 25 having a central orifice 26 similar to the orifice 5 in the plate 4 is formed with an outwardly projecting and upwardly extending lip 27 which fits into a recess 28 formed in the shoe 1 and under the depressed portion 29 in the said shoe. The lip 27 fits snugly against the surface of the projection 29 and the outer projecting lug portion 30 is forced downwardly to its position and the set screw 31 inserted through the orifice therein and into the threaded orifice 32 in the shoe thus holding the said end lug 27 in tension and keeping it from becoming loose. In the event of wear in the walls of the orifice 26 or the calk 3, the plate 25 may be adjusted by tightening the set screw 30.

One of the set screws used in holding the heel calk plates is dispensed with in the form shown in Figs. 7 and 8. When this form is used the heel of the shoe 1 is beveled inwardly from the bottom face and the plate 33 formed with a depending flange 34 around the sides and back thereof beveled inwardly to fit the beveled surface of the sides of the said heel portion. The plate 33 has a central tapered orifice 35 which fits the sloping sides of the triangular calk, and 36 is a depression in the upper surface of the said plate forming a downwardly projecting cross teat 37.

38 is a lateral recess formed in the bottom face of the shoe and adapted to receive the teat 37 when the plate 33 is driven tightly into position. The forward end of the plate 33 is held down to the shoe by the set screw 39 extending therethrough.

In the use of a calk such as described it will be seen that the calk presents a sharp wearing surface in the form of a triangular block which is preferably formed of hardened steel, though of course, any other suitable material may be used. The triangular form of the calk renders it useful in obtaining a foothold even when the sharp edge or apex of the triangle is worn off as the sloping sides form a wedge and thus a more or less sharp edge is presented. When the edge of the calk becomes worn or if it is desired to change the calk for any reason, it is merely necessary to remove the set-screws and lift off the retaining plate, when the calk 5 may be turned and a new edge projected through the central orifice of the said plate and the said plate secured firmly in position again.

In the form of heel calk shown in Figs. 7 and 8 the plate 33 is placed over the calk and driven longitudinally into position. The side flanges do not extend to the forward end of the said plate; therefore, the end may spring upwardly to allow the teat 37 to pass over the surface of the shoe and upon reaching the recess 38 drop thereinto thus firmly holding the said plate from moving backward. The screw 39 is then inserted through the said plate into the shoe and screwed down tightly, drawing the said plate into position and holding the said calk securely against the face of the plate.

It is quite obvious from this description that a removable calk such as described has many advantages over stationary calks and other removable calks as the wearing surface of the calk may be very quickly changed without having to employ the services of an expert and in the event of the calk and the holding plate becoming loose they may be adjusted to fit tightly without trouble.

It must be understood that many variations in the form of either the calks or the holding plates may be made without departing from the spirit of this invention, the main feature being in forming a calk with sloping faces and a holding plate which may be tightened thereon.

Having thus described the preferred embodiment of my invention, what I claim as new and desire to secure by Letters Patent of the United States is:

1. The combination with a horseshoe, of a calk engaging the same, an orificed holder plate lying on the underside of the shoe and receiving the calk in the orifice of the holder plate, to hold the calk in position, and means for exerting a strain on the plate transversely of the plane in which the shoe lies, by which to draw the plate toward the underside of the shoe.

2. The combination with a horseshoe, of a reversible calk of prismatic cross sectional form, a holder plate having an orifice extending through it from side to side, the side walls of the orifice in the plate engaging opposite oblique surfaces of the calk, and means for drawing the holder plate toward the shoe, whereby the calk is pressed against the shoe and held firmly engaged in the orifice of the holder plate.

3. The combination with a horseshoe, of a reversible calk, a holder plate for securing the same in position, said holder plate having one end engaged with the shoe, and means for exerting a transverse strain on the other end of the holder plate to draw it toward the shoe.

4. The combination with a horseshoe having a recess therein, a removable calk, a holder plate adapted to retain the calk in position, the holder plate having one end engaged in the recess of the shoe, and means for exerting a transverse strain on the other end of the holder plate to draw it toward the shoe.

5. In a horseshoe, in combination, a removable calk having sloping sides and resting on said shoe, a plate having a central raised portion and an orifice through the center thereof adapted to receive said calk and having the inner walls of said raised portion conforming to the slope of the walls of said calk, said plate being held from the surface of said shoe and having projecting lips engaging the edges of said shoe, and means for adjustably securing said plate and said calk to said shoe, substantially as described.

In testimony whereof I have signed my name to this specification in the presence of two subscribing witnesses.

HERBERT PERCY KENNEDY.

Witnesses:
   ALEDA EAGLETON.
   BOSVILLE PLACE.